Dec. 18, 1945.  A. WARMISHAM  2,391,209
OPTICAL OBJECTIVE
Filed July 13, 1942
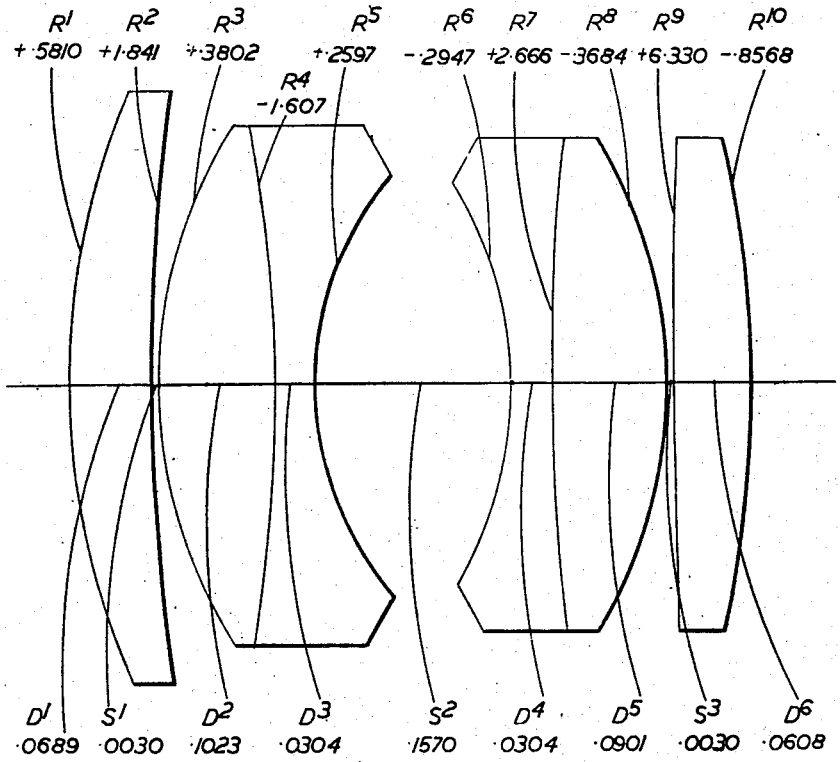
INVENTOR
A. WARMISHAM
BY
ATTORNEYS Patented Dec. 18, 1945

2,391,209

UNITED STATES PATENT OFFICE 2,391,209

OPTICAL OBJECTIVE

Arthur Warmisham, Leicester, England, assignor to Taylor, Taylor & Hobson Limited, Leicester, England, a company of Great Britain Application July 13, 1942, Serial No. 450,708
In Great Britain July 14, 1941

7 Claims. (Cl. 88—57)

This invention relates to an optical objective for photographic or other purposes of the kind corrected for spherical and chromatic aberrations, coma, astigmatism, field curvature and distortion, and comprising two compound divergent meniscus components located between two simple convergent components and each having a divergent element cemented to a convergent element.

The invention has for its object to provide an improved objective of this kind well corrected over a wide angle of view for all the aberrations.

In the objective according to the present invention the average value of the Abbé V numbers of the glasses used for the four convergent elements lies between 46 and 50 and the average value of the Abbé V numbers of the glasses used for the two divergent elements lies between 33 and 37, the convergent elements of the two compound meniscus components each being made of dense barium flint glass having mean refractive index between 1.64 and 1.66.

Preferably, each of the two simple convergent components is also made of dense barium flint glass having mean refractive index between 1.64 and 1.66, whilst each divergent element is made of a flint glass having mean refractive index between 1.62 and 1.66.

A preferred example of objective according to the invention is illustrated in the accompanying drawing and numerical data for such example are given in the following table, in which $R_1, R_2 \ldots$ represent the radii of curvature of the individual lens surfaces counting from the front (that is the side of the longer conjugate), the positive sign indicating that the surface is convex to the front and the negative that it is concave thereto, $D_1, D_2 \ldots$ represent the axial thicknesses of the various elements, and $S_1, S_2, S_3$ represent the axial air separations between the components. The table also gives the mean refractive indices and the Abbé V numbers of the materials used for the individual elements of the objective.

In this example it will be noticed that all four convergent elements are made of the same dense barium flint glass having Abbé V number 48.3 and mean refractive index 1.644, whilst the two divergent elements are made of different flint glasses having average Abbé V number 34.8, the mean refractive indices of both lying between 1.62 and 1.66. This example is well corrected for all the aberrations over a semi-angular field of 24 degrees.

Equivalent focal length, 1.000   Relative aperture, F/2.0

| Radius | Thickness or air separation | Refractive index $n_D$ | Abbé V number |
|---|---|---|---|
| $R_1+ .5810$ | $D_1 .0689$ | 1.644 | 48.3 |
| $R_2+1.841$ | $S_1 .0030$ | | |
| $R_3+ .3802$ | $D_2 .1023$ | 1.644 | 48.3 |
| $R_4-1.607$ | $D_3 .0304$ | 1.621 | 36.1 |
| $R_5+ .2597$ | $S_2 .1570$ | | |
| $R_6- .2947$ | $D_4 .0304$ | 1.651 | 33.5 |
| $R_7+2.666$ | $D_5 .0901$ | 1.644 | 48.3 |
| $R_8- .3684$ | $S_3 .0030$ | | |
| $R_9+6.330$ | $D_6 .0608$ | 1.644 | 48.3 |
| $R_{10}- .8568$ | | | |

It will be appreciated that the foregoing example has been given by way of example only and that the invention can be carried into practice in other ways.

What I claim as my invention and desire to secure by Letters Patent is:

1. An optical objective comprising two compound divergent meniscus components located between two simple convergent components and having numerical data substantially as set forth in the following table:

Equivalent focal length, 1.000   Relative aperture, F/2.0

| Radius | Thickness or air separation | Refractive index $n_D$ | Abbé V number |
|---|---|---|---|
| $R_1=+ .5810$ | $D_1=.0689$ | 1.644 | 48.3 |
| $R_2=+1.841$ | $S_1=.0030$ | | |
| $R_3=+ .3802$ | $D_2=.1023$ | 1.644 | 48.3 |
| $R_4=-1.607$ | $D_3=.0304$ | 1.621 | 36.1 |
| $R_5=+ .2597$ | $S_2=.1570$ | | |
| $R_6=- .2947$ | $D_4=.0304$ | 1.651 | 33.5 |
| $R_7=+2.666$ | $D_5=.0901$ | 1.644 | 48.3 |
| $R_8=- .3684$ | $S_3=.0030$ | | |
| $R_9=+6.330$ | $D_6=.0608$ | 1.644 | 48.3 |
| $R_{10}=- .8568$ | | | | where $R_1R_2$ represent the radii of curvature of the surfaces, $D_1D_2$ represent the axial thicknesses of the elements and $S_1S_2$ represent the axial separations between the components in accordance with the usual convention.

2. An optical objective corrected for spherical and chromatic aberrations, coma, astigmatism, field curvature and distortion, and comprising two compound divergent meniscus components located between two simple convergent components and each having a divergent element cemented to a convergent element, wherein the average value of the Abbé V numbers of the glasses used for the four convergent elements lies between 46 and 50 and the average value of the Abbé V numbers of the glasses used for the two divergent elements lies between 33 and 37, the convergent elements of the two compounds meniscus components each being made of dense barium flint glass having mean refractive index between 1.64 and 1.66, whilst the outer air-exposed surfaces of the two compound meniscus components are convex and have radii of curvature each lying between 0.35 and 0.40 times the equivalent focal length of the objective, in which the overall axial length of the objective is less than 0.6 times the equivalent focal length of the objective, and each of the two simple convergent components is made of dense barium flint glass having mean refractive index between 1.64 and 1.66, whilst each divergent element is made of flint glass having mean refractive index between 1.62 and 1.66.

3. An optical objective corrected for spherical and chromatic aberrations, coma, astigmatism, field curvature and distortion, and comprising two compound divergent meniscus components located between two simple convergent components and each having a divergent element cemented to a convergent element, wherein the average value of the Abbé V numbers of the glasses used for the four convergent elements lies between 46 and 50 and the average value of the Abbé V numbers of the glasses used for the two divergent elements lies between 33 and 37, the convergent elements of the two compound meniscus components each being made of dense barium flint glass having mean refractive index between 1.64 and 1.66, whilst the overall axial length of the objective is less than 0.6 times the equivalent focal length of the objective, with the first radius between 0.52 and 0.65 and the last radius between 0.80 and 0.90.

4. An optical objective as claimed in claim 3, in which each of the two simple convergent components is made of dense barium flint glass having mean refractive index between 1.64 and 1.66, whilst each divergent element is made of flint glass having mean refractive index between 1.62 and 1.66.

5. An optical objective corrected for spherical and chromatic aberrations, coma, astigmatism, field curvature and distortion, and comprising two compound divergent meniscus components located between two simple convergent components and each having a divergent element cemented to a convergent element, wherein the average value of the Abbé V numbers of the glasses used for the four convergent elements lies between 46 and 50 and the average value of the Abbé V numbers of the glasses used for the two divergent elements lies between 33 and 37, the convergent elements of the two compound meniscus components each being made of dense barium flint glass having mean refractive index between 1.64 and 1.66, whilst the overall axial length of the objective is less than 0.6 times the equivalent focal length of the objective, with the fifth radius between 0.24 and 0.28, and the sixth radius between 0.27 and 0.32.

6. An optical objective corrected for spherical and chromatic aberrations, coma, astigmatism, field curvature and distortion, and comprising two compound divergent meniscus components located between two simple convergent components and each having a divergent element cemented to a convergent element, wherein the average value of the Abbé V numbers of the glasses used for the four convergent elements lies between 46 and 50 and the average value of the Abbé V numbers of the glasses used for the two divergent elements lies between 33 and 37, the convergent elements of the two compound meniscus components each being made of dense barium flint glass having mean refractive index between 1.64 and 1.66, whilst the rear surface of the front compound divergent meniscus component and the front surface of the rear compound divergent meniscus component have radii of curvature respectively between 0.24 and 0.28 and between 0.27 and 0.32 times the equivalent focal length of the objective and the radii of curvature of the other air-exposed surfaces of these two components each lie between 0.35 and 0.40 times such focal length, the front and rear surfaces of the objective respectively having radii of curvature between 0.52 and 0.65 and between 0.80 and 0.90 times such focal length.

7. An optical objective as claimed in claim 5, in which each of the two simple convergent components is made of dense barium flint glass having mean refractive index between 1.64 and 1.66, while each divergent element is made of flint glass having mean refractive index between 1.62 and 1.66.

ARTHUR WARMISHAM.